US006237066B1

(12) United States Patent
Pan et al.

(10) Patent No.: US 6,237,066 B1
(45) Date of Patent: May 22, 2001

(54) SUPPORTING MULTIPLE OUTSTANDING REQUESTS TO MULTIPLE TARGETS IN A PIPELINED MEMORY SYSTEM

(75) Inventors: Bi-Yu Pan, Cupertino; Marc Tremblay, Menlo Park, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/273,850

(22) Filed: Mar. 22, 1999

(51) Int. Cl.$^7$ ........................................................ G06F 12/02
(52) U.S. Cl. ........................... 711/149; 711/117; 711/118; 711/131; 711/156; 711/168; 710/39; 710/52; 712/9
(58) Field of Search ..................................... 711/117, 118, 711/131, 149, 156, 168; 710/39, 52; 712/9

(56) References Cited

U.S. PATENT DOCUMENTS

| 5,430,888 | | 7/1995 | Witek ................................... 395/800 |
| 5,465,336 | * | 11/1995 | Imai et al. ............................ 712/216 |
| 5,557,768 | * | 9/1996 | Braceras et al. ..................... 711/131 |
| 5,659,782 | | 8/1997 | Senter et al. .................... 395/800.23 |
| 5,689,670 | * | 11/1997 | Luk ...................................... 712/207 |
| 5,737,547 | | 4/1998 | Zuravleff et al. .................... 395/292 |
| 5,745,729 | * | 4/1998 | Greenley et al. ..................... 711/131 |

* cited by examiner

*Primary Examiner*—Hiep T. Nguyen
(74) *Attorney, Agent, or Firm*—Park, Vaughan & Fleming LLP

(57) ABSTRACT

One embodiment of the present invention provides an apparatus that supports multiple outstanding load and/or store requests from an execution engine to multiple sources of data in a computer system. This apparatus includes a load store unit coupled to the execution engine, a first data source and a second data source. This load store unit includes a load address buffer, which contains addresses for multiple outstanding load requests. The load store unit also includes a controller that coordinates data flow between the load address buffer, a register file, the first data source and the second data source so that multiple load requests can simultaneously be outstanding for both the first data source and the second data source. These load requests return in-order for each of the multiple sources of data in the computer system, except for load requests directed to a data cache which can return out-of-order. Load requests may return out-of-order with respect to load requests from other data sources. According to one aspect of the present invention, the load store unit additionally includes a store address buffer, that contains addresses for multiple outstanding store requests, and a store data buffer that contains data for the multiple outstanding store requests. The controller is further configured to coordinate data flow between the first data source, the second data source, the store address buffer and the store data buffer, so that multiple store requests can simultaneously be outstanding for both the first data source and the second data source.

28 Claims, 4 Drawing Sheets

SUPPORTING MULTIPLE OUTSTANDING REQUESTS TO MULTIPLE TARGETS IN A PIPELINED MEMORY SYSTEM

BACKGROUND

1. Field of the Invention

The present invention relates to the design of computer systems. More specifically, the present invention relates to the design of a load store unit for a computer system that supports simultaneous outstanding requests to multiple targets.

2. Related Art

Recent processor designs achieve high performance by operating multiple pipelined functional units in parallel. This allows more than one computational operation to complete on a given clock cycle. In order to keep pace with such processor designs, memory systems have been modified to allow pipelining of memory accesses. This allows memory access requests to be issued before prior memory accesses return, which can greatly increase memory system throughput.

However, if a computer program changes sources of data (targets) during program execution, such pipelined memory systems typically stall, which can greatly degrade system performance. For example, if a program makes an access to a graphics co-processor in between pipelined accesses to main memory, the accesses to main memory will stall. This can be a significant problem for processor designs that support interleaved accesses to many different sources of data (targets). For example, a given processor may be able to access data from a data cache, a main memory, a graphics co-processor and from a variety of bus interfaces.

Furthermore, such pipelined memory systems typically issue at most one access request on a given clock cycle, which can limit performance in situations where multiple requests are simultaneously generated by multiple pipelined functional units, or when multiple requests have been accumulated in a buffer due to resource conflicts.

What is needed is a memory system design that overcomes these performance limitations of existing memory systems.

SUMMARY

One embodiment of the present invention provides an apparatus that supports multiple outstanding load and/or store requests from an execution engine to multiple sources of data in a computer system. This apparatus includes a load store unit coupled to the execution engine, a first data source and a second data source. This load store unit includes a load address buffer, which contains addresses for multiple outstanding load requests. The load store unit also includes a controller that coordinates data flow between the load address buffer, a register file and the first data source and the second data source so that multiple load requests can simultaneously be outstanding for both the first data source and the second data source. According to one aspect of the present invention, the load store unit additionally includes a store address buffer, that contains addresses for multiple outstanding store requests, and a store data buffer that contains data for the multiple outstanding store requests. The controller is further configured to coordinate data flow between the first data source, the second data source, the store address buffer and the store data buffer, so that multiple store requests can simultaneously be outstanding for both the first data source and the second data source.

According to one aspect of the present invention, the load store unit is additionally coupled to a third data source, and the controller is configured to coordinate data flow so that multiple load requests can simultaneously be outstanding for the third data source.

According to one aspect of the present invention, the load store unit is coupled to the first data source, which is a data cache, through a first communication pathway, and is coupled to the second data source through a second communication pathway that is separate from the first communication pathway.

According to one aspect of the present invention, the controller is configured so that load requests return in-order from the second data source, but can return out-of-order from the first data source.

According to one aspect of the present invention, the controller is configured so that multiple load requests can be sent to different data sources in the same clock cycle.

According to one aspect of the present invention, the controller includes a separate state machine for each entry in the load address buffer.

According to one aspect of the present invention, the second data source includes one of, an interface to a computer system bus, a random access semiconductor memory, a secondary storage device, and a computer graphics accelerator.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Computer System

Figure 1:
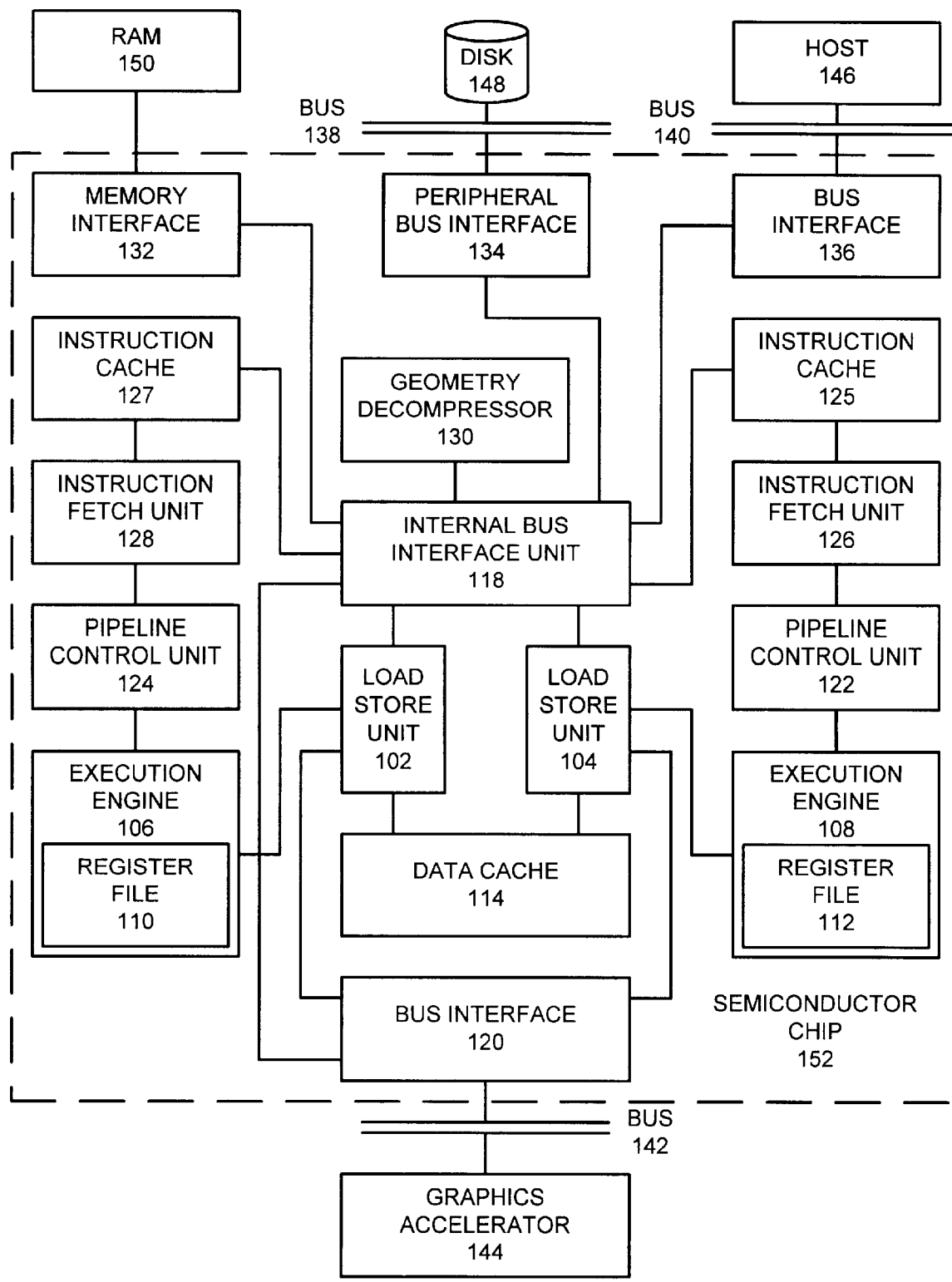
FIG. 1 illustrates a computer system in accordance with an embodiment of the present invention.

FIG. 1 illustrates a computer system in accordance with an embodiment of the present invention. Much of the circuitry in the computer system resides within semiconductor chip 152.

Note that the computer system includes two execution engines 106 and 108. Each execution engine 106 and 108 receives a stream of instructions and performs specified operations on particular data items. Execution engines 106 and 108 perform central processing unit (CPU) functions, including arithmetic operations and data movement operations. Note that execution engines 106 and 108 include register files 110 and 112, respectively. Register files 110 and 112 are used to store data items to be operated on by execution engines 106 and 108, respectively. Note that in another embodiment of the present invention, execution engines 106 and 108 access overlapping registers that are shared between execution engines 106 and 108.

Execution engines 106 and 108 receive a stream of instructions from instruction fetch units 128 and 126, respectively. More specifically, instruction fetch unit 128 receives a stream of instructions from random access memory (RAM) 150. This stream of instructions traverses memory interface 132, internal bus interface unit 118 and instruction cache 127 before being received by instruction fetch unit 128. Instruction fetch unit 128 feeds the received stream of instructions through pipeline control unit 124 into execution engine 106. Similarly, instruction fetch unit 126 receives a stream of instructions from random access memory (RAM) 150. This stream of instructions traverses memory interface 132, internal bus interface unit 118 and instruction cache 125 before being received by instruction fetch unit 126. Instruction fetch unit 126 feeds the received stream of instructions through pipeline control unit 124 into execution engine 108.

Note that RAM 150 comprises the main memory of the computer system, and may include any type of randomly accessible computer memory for storing code and/or data. Instruction caches 127 and 125 may include any type of cache memory for instructions for execution by execution engines 106 and 108, respectively. Instruction fetch units 128 and 126 coordinate accesses to instructions, while pipeline control units 124 and 122, respectively, coordinate scheduling of these instructions for pipelined execution.

Execution engines 106 and 108 receive data from load store units 102 and 104, respectively. Load store units 102 and 104 coordinate data transfers to and from a number of sources including data cache 114, as well as bus interfaces 120 and 136, peripheral bus interface 134, memory interface 132 and geometry decompressor 130.

In the illustrated embodiment, peripheral bus interface 134 is coupled to bus 138, which is coupled to disk 148. Disk 148 is a secondary storage device, which can include any type of nonvolatile storage for computer data such as a disk or a tape drive. Disk 148 may also include any type of peripheral attached to peripheral bus 138. In a variation on the illustrated embodiment, bus 138 includes a PCI bus.

Note that bus interface 136 is coupled to bus 140, which is coupled to host system 146. This allows a user operating host system 146 to download computational tasks onto execution engines 106 and 108. Also note that bus interface 120 is coupled to bus 142, which is coupled to graphics accelerator 144. Graphics accelerator 144 can be any type of circuitry that performs graphics computations. Note that geometry decompressor 130 is also a graphics accelerator. However, the circuitry within geometry decompressor 130 is tailored to the particular task of decompressing graphics data that is received in compressed form.

Note that load store unit 102 is coupled with data cache 114 and bus interface 120 through separate data paths. This allows simultaneous accesses to data cache 114 and bus interface 120. Similarly, load store unit 104 is coupled with data cache 114 and bus interface 120 through separate data paths. Also note that the system includes a single dual-ported data cache 114, which is coupled to both load store units 102 and 104. Data cache 114 may include any type of cache memory for storing data to be operated on by execution engines 106 and 108.

Internal bus interface unit 118 includes data paths and switching circuitry within semiconductor chip 152 for coupling load store units 102 and 104 with a number of sources of data (targets). More specifically, internal bus interface unit 118 couples load store units 102 and 104 with memory interface 132, peripheral bus interface 134, bus interface 120, bus interface 136 and geometry decompressor 130.

During operation, the system illustrated in FIG. 1 operates generally as follows. As mentioned above, streams of instructions are pulled from RAM 150 through memory interface 132 and internal bus interface unit 118 into instruction fetch units 128 and 126 respectively. These streams of instructions are fed through pipeline control units 124 and 122 into execution engines 106 and 108, respectively. While executing these instruction streams, execution engines 106 and 108 transfer data between load store units 102 and 104 and register files 110 and 112 within execution engines 106 and 108, respectively. Load store units 102 and 104 retrieve data from a number sources, including data cache 114, bus interface 120, memory interface 132, peripheral bus interface 134, bus interface 136 and geometry decompressor 130.

Load Store Unit

Figure 2:
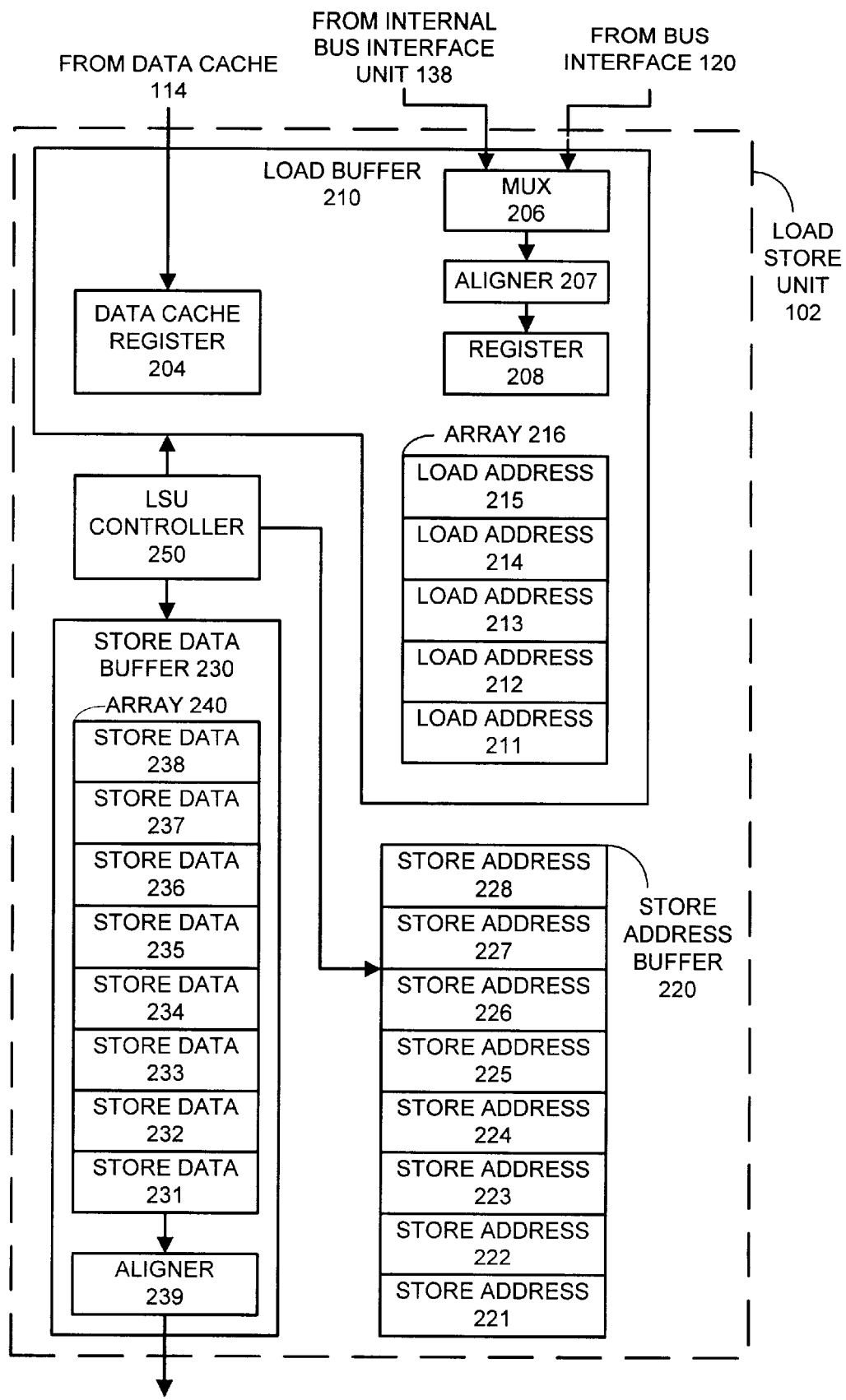
FIG. 2 illustrates part of the internal structure of a load store unit in accordance with an embodiment of the present invention.

FIG. 2 illustrates part of the internal structure of load store unit 102 in accordance with an embodiment of the present invention. Load store unit 102 includes a number of functional units including load buffer 210, store data buffer 230 and store address buffer 220. These functional units operate under control of LSU controller 250.

Load buffer 210 includes a number of components including aligner 207, data cache register 204, MUX 206, register 208 and an array 216. MUX 206 selects between the output of internal bus interface unit 118 and bus interface 120 for input into register 208. Aligner 207 performs byte alignment functions on words of data received from sources besides data cache 114. Note that data received from data cache 114 is aligned by circuitry within data cache 114. Array 216 includes entries for five load addresses, including load address entries 211, 212, 213, 214, and 215. These five load addresses can store addresses for up to five pending load requests. Note that these load requests can be directed to any source of data (target) coupled to load store unit 102, including data cache 114, bus interface 120, memory interface 132, bus peripheral bus interface 134, bus interface 136 and geometry decompressor 130. For example, three addresses may be associated with pending requests to data cache 114 and two addresses may be associated with pending requests to RAM 150.

The circuitry within load buffer 210 operates under control of LSU controller 250, which includes a separate state machine for each entry within array 216. The circuitry within load buffer 210 operates generally as follows. Upon receiving a load request, the system stores an address from the load request along with additional state information in an entry in array 216. The system next, issues the load request to the specified source of data. When the requested data returns from data cache 114, it is recorded in data cache register 204. From data cache register 204, the data is passed into a specified register within register file 110 in execution engine 106 (see FIG. 1). If the requested data returns from any other source, it passes through MUX 206 and aligner 207 into register 208. From register 208, the data passes into a specified register within register file 110 in execution engine 106. Once the data returns, the corresponding entry in array of addresses 216 is invalidated so that it can be reused for a new load request.

Note that requests to data cache 114 may return out of order. The system has been designed this way because some requests will generate cache faults, which take a great deal of time to process. By allowing requests to return out of order, requests that generate cache hits will not necessarily have to wait for the requests that generate cache misses. Note that requests to other devices besides data cache 114 must return in order. This means for a given device all requests issued by the device return in order. However, requests may return out of order as between devices.

Store operations use store data buffer 230 and store address buffer 220. Store data buffer 230 includes array 240 as well as aligner 239. Array 240 includes eight entries for storing data for up to eight pending store requests, including store data 231, 232, 233, 234, 235, 236, 237 and 238. Store address buffer 220 includes corresponding addresses and other state information associated with the store requests. This includes store address buffers 221, 222, 223, 224, 225, 226, 227 and 228.

Store data buffer 230 and store address buffer 220 operate under control of LSU controller 250, which includes a separate state machine for each entry within store address buffer 220. The circuitry within store data buffer 230 and store address buffer 220 operates generally as follows. Upon receiving a store request, the system stores an address for the store request along with additional state information in an entry within store address buffer 220. The data associated with the store request is loaded into a corresponding entry in array 240 within store data buffer 230. Next, the system issues the store request to the specified target. When the data is finally written out to the target, the corresponding entries in store data buffer 230 and store address buffer 220 are invalidated so that they can be reused for new store requests.

Load Address Buffer Entry

Figures 3, 4:
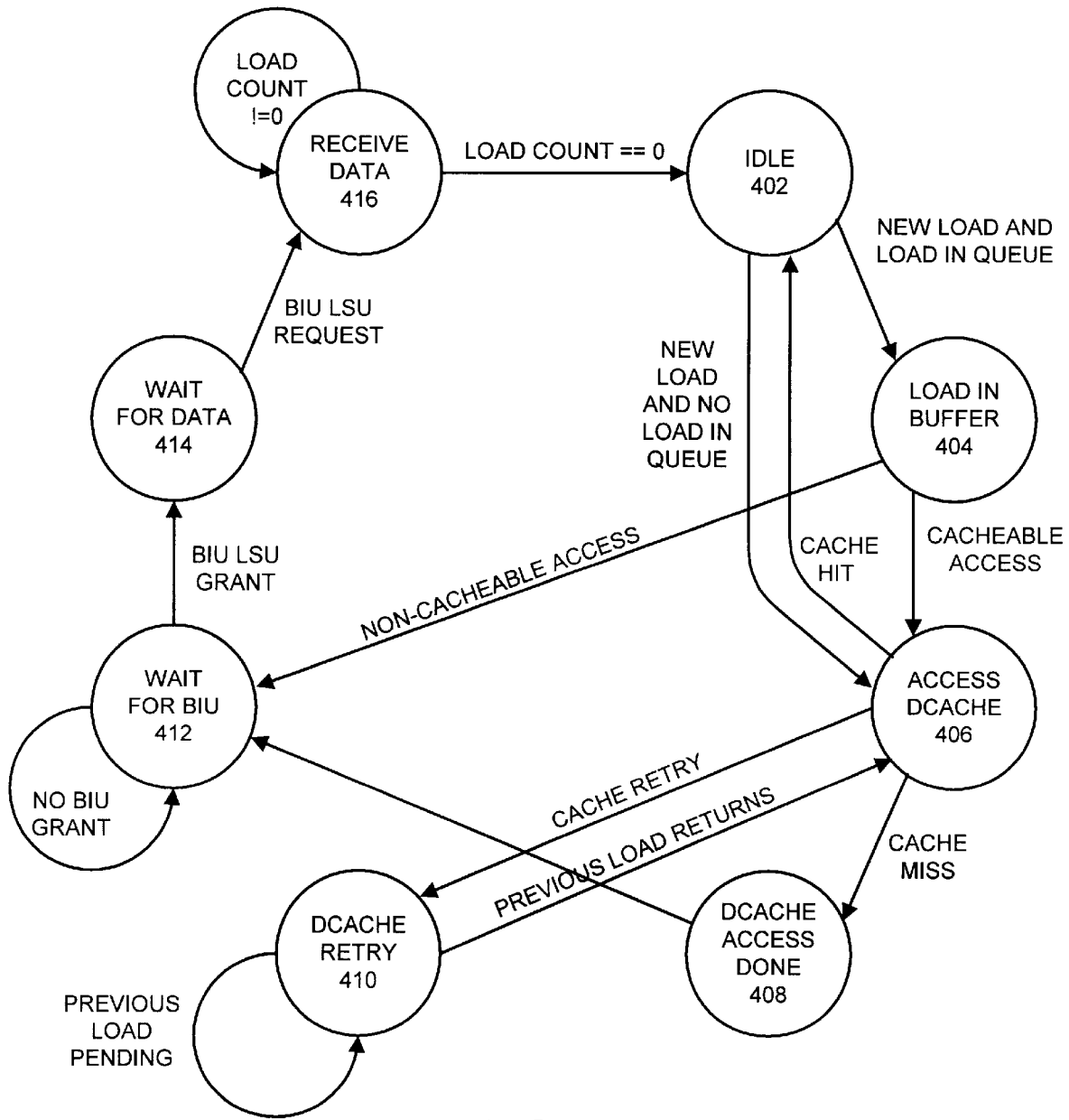
FIG. 3 illustrates some of the information maintained for a given entry in a load buffer in accordance with an embodiment of the present invention.
FIG. 4 illustrates a state diagram for a given entry in a load buffer in accordance with an embodiment of the present invention.

FIG. 3 illustrates some of the information maintained in a given entry in array 216 in load buffer 210 in accordance with an embodiment of the present invention. In this embodiment, the entry includes three or four bits of state information 302 indicating the state of a particular entry. This state information is updated as the corresponding load request progresses. The state diagram for a given entry will be discussed in more detail with reference to FIG. 4 below. The entry also includes four bits specifying a target (source of data) 304 for the load request. For example, the target may be data cache 114 or geometry decompressor 130 from FIG. 1. The entry also includes a cacheable bit 306, which indicates whether the particular entry corresponds to data that is to be stored in data cache 114. The entry additionally includes an "in use" bit 308 that specifies whether the particular entry is presently being used or not. The entry further includes a register specifier 309, which specifies a destination register within execution engine 106 for the load request. Finally, address 310 includes the address for the load request.

State Machine for Load Address Buffer Entry

FIG. 4 illustrates a state diagram for a given entry in a load buffer 210 in accordance with an embodiment of the present invention. The system typically starts in idle state 402. When a new load instruction arrives from execution engine 106, the system does one of two things. If there is a load request presently in the queue, the system moves into state 404 where the load request arrives but has not yet been sent out to data cache 114 or internal bus interface unit 118. If no load is presently in the queue and the access is a cacheable access, the system goes directly to state 406, in which a data cache access commences. If no load is presently in the queue and the access is not cacheable, the system goes to state 412.

In state 404, if the access is cacheable the system goes to state 406 in which a data cache access commences. Otherwise, the system goes to state 412 to wait for access to internal bus interface unit 118.

In state 406 the system initiates a data cache access. If there is a cache hit, the data item is immediately produced by the data cache and the load request is complete. The system then returns to idle state 402 to receive a new load request. If there is a cache miss, the system proceeds to state 408 in which the data cache access is terminated; the system next initiates an access to main memory and proceeds to state 412. In state 412, the main memory access begins by waiting for access to internal bus interface unit 118. If the access is to a cache line that is presently being retrieved from main memory because of a recent cache miss to the same cache line, the system goes to state 410 to wait for the pending cache access to complete. Once the pending access completes, the system returns to state 406 to continue with the cache access.

In state 412, the system is waiting for access to internal bus interface unit 118. This may either be an access to main memory (in the case of a cacheable access) or an access to another target coupled to internal bus interface unit 118 (in the case of a non-cacheable access). In state 412, the system waits for access to internal bus interface unit 118. When access is granted, the system proceeds to state 414 in which the system makes the access request across internal bus interface unit 118 and waits for the requested data to return. The system next proceeds to state 416, in which the requested data is received. Receiving the data may require multiple data transfers because the requested data may span multiple words.

Finally, the system completes the load operation and returns to idle state 402. However, if a new load request is pending, the system skips idle state 402, and proceeds directly to state 404 to begin the new load operation.

Note that load store unit 102 includes three separate ports coupled to data cache 114, internal bus interface unit 118 and bus interface 120. This allows load store unit 102 to dispatch three requests in parallel, if such parallel dispatch is supported by a system state machine. Load store unit 104 similarly includes three separate ports coupled to data cache 114, internal bus interface unit 118 and bus interface 120.

State Machine for Store Address Buffer Entry

Figure 5:
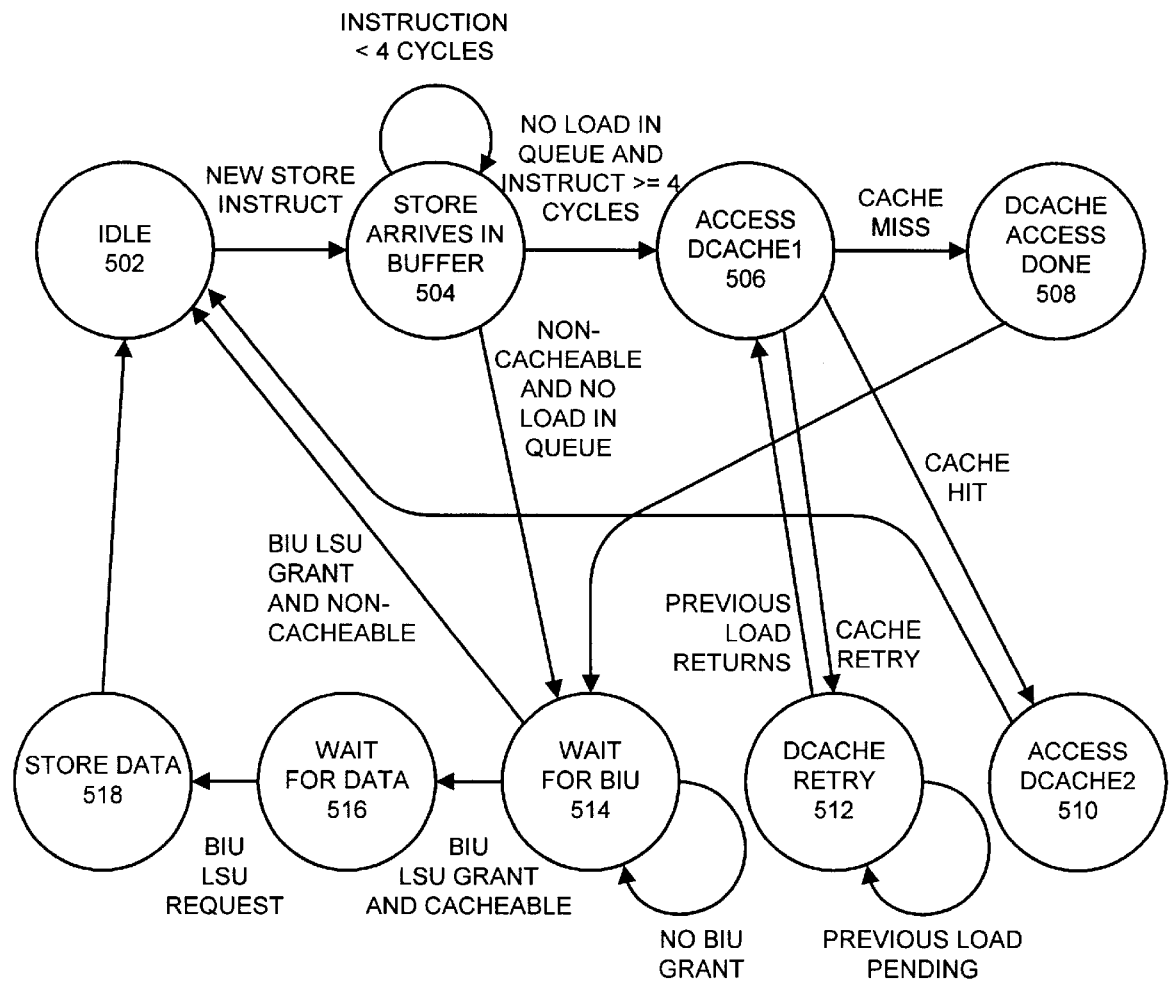
FIG. 5 illustrates a state diagram for a given entry in a store address buffer in accordance with an embodiment of the present invention.

FIG. 5 illustrates a state diagram for a given entry in a store address buffer in accordance with an embodiment of the present invention. The system typically starts in idle state 502. When a new store instruction arrives, the system proceeds to state 504 in which the system loads the store request in store data buffer 230 and store address buffer 220.

In state 504, if the access is a cacheable access the system goes to state 506 in which a data cache access commences. Otherwise, the system goes to state 514 to wait for access to internal bus interface unit 118.

In state 506 the system initiates a data cache access. If there is a cache hit, the system proceeds to state 510 in which the data is written out to the cache before returning to idle state 502. If there is a cache miss, the system proceeds to state 508 in which the data cache access is terminated; the system next initiates an access to main memory and proceeds to state 514. In state 514, the main memory access begins by waiting for access to internal bus interface unit 118. If the access is to a cache line that is presently being retrieved from main memory because of a recent cache miss to the same cache line, the system goes to state 512 to wait for the pending cache access to complete. Once the pending access completes, the system returns to state 506 to continue with the cache access.

In state 514, the system is waiting for access to internal bus interface unit 118. This may either be an access to main memory (in the case of a cacheable access) or an access to another target coupled to internal bus interface unit 118 (in the case of a non-cacheable access). In state 514 the system makes an access request across internal bus interface unit 118 and waits for access to be granted to internal bus interface unit 118. When access is granted, the system proceeds to state 516 in which the system waits for the requested data to return. The system next proceeds to state 518, in which the requested data is received. Note that a controller within data cache 114 actually combines the data to be stored by load store unit 102 with the cache line received from RAM 150.

Finally, the system completes the store operation and returns to idle state 502. However, if a new store request is pending, the system skips idle state 502, and proceeds directly to state 504 to begin the new store operation.

Note that although load store unit 102 and 104 include three separate ports (to data cache 114, internal bus interface unit 118 and bus interface 120), returns to register files 110 and 112 are actually serialized. Also note that priority is given to accesses to data cache 114 first, accesses to internal bus interface unit 118 second, and accesses to bus interface unit 120 third.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. An apparatus that supports multiple outstanding load requests from an execution engine to multiple sources of data in a computer system including a data cache, the apparatus comprising:
    a load store unit coupled to the execution engine, a first data source and a second data source, wherein the first data source is the data cache;
    a first data port within the load store unit coupled to the first data source;
    a second data port within the load store unit coupled to the second data source, so that the load store unit can simultaneously send load requests to the first data source and the second data source;
    a load address buffer within the load store unit, that contains addresses for multiple outstanding load requests;
    a register file for storing data received by the load store unit during a load request; and
    a controller that is configured to coordinate data flow between the load address buffer, the register file, the first data source and the second data source, so that multiple load requests can simultaneously be outstanding for both the first data source and the second data source.

2. The apparatus of claim 1, further comprising:
    a store address buffer, that contains addresses for multiple outstanding store requests;
    a store data buffer that contains data for the multiple outstanding store requests; and
    wherein the controller is configured to coordinate data flow between the first data source, the second data source, the store address buffer and the store data buffer, so that multiple store requests can simultaneously be outstanding for both the first data source and the second data source.

3. The apparatus of claim 1, wherein the load store unit is additionally coupled to a third data source through a third data port so that the load store unit can send multiple load requests to the first data source, the second data source, and the third data source simultaneously, and wherein the controller is configured to coordinate data flow so that multiple load requests can simultaneously be outstanding for the first data source, the second data source and the third data source.

4. The apparatus of claim 1, wherein the load store unit is coupled to the data cache through a first communication pathway, and is coupled to the second data source through a second communication pathway that is separate from the first communication pathway.

5. The apparatus of claim 1, wherein the controller is configured so that load requests return in-order for each of the multiple sources of data in the computer system, except for load requests directed to a data cache which can return out-of-order.

6. The apparatus of claim 5, wherein the controller is configured so that load requests can return out-of-order with respect to load requests from other data sources.

7. The apparatus of claim 1, wherein the controller is configured so that multiple load requests can be sent to different data sources in the same clock cycle.

8. The apparatus of claim 1, wherein the controller includes a separate state machine for each entry in the load address buffer.

9. The apparatus of claim 1, wherein the second data source includes an interface to a computer system bus.

10. The apparatus of claim 1, wherein the second data source includes a random access semiconductor memory.

11. The apparatus of claim 1, wherein the second data source includes a secondary storage device.

12. The apparatus of claim 1, wherein the second data source includes one of a computer graphics accelerator, a processor and a bridge chip.

13. The apparatus of claim 1, wherein each entry in the load address buffer is associated with status information indicating a target for the load request, wherein the target may include one of the first data source and the second data source.

14. The apparatus of claim 1, wherein each entry in the load address buffer is associated with status information indicating whether data received during an associated load request is cacheable.

15. The apparatus of claim 1, wherein each entry in the load address buffer is associated with status information indicating a state of an associated load request.

16. The apparatus of claim 1, wherein each entry in the load address buffer is associated with status information indicating a destination register of an associated load request.

17. The apparatus of claim 1, further comprising alignment circuitry for aligning data received during the load request before it is stored in the register file.

18. An apparatus that supports multiple outstanding load and store requests from an execution engine to multiple sources of data in a computer system including a data cache, the apparatus comprising:
- a load store unit coupled to the execution engine, a first data source and a second data source, wherein the first data source is the data cache;
- a first data port within the load store unit coupled to the first data source;
- a second data port within the load store unit coupled to the second data source, so that the load store unit can simultaneously send load requests to the first data source and the second data source;
- a load address buffer within the load store unit, that contains addresses for multiple outstanding load requests;
- a register file for storing data received by the load store unit during a load request;
- a store address buffer, that contains addresses for multiple outstanding store requests;
- a store data buffer, that contains data for the multiple outstanding store requests; and
- a controller that is configured to coordinate data flow between the load address buffer, the register file, the first data source and the second data source, so that multiple load requests can simultaneously be outstanding for both the first data source and the second data source;
- wherein the controller is additionally configured to coordinate data flow between the first data source, the second data source, the store address buffer and the store data buffer, so that multiple store requests can simultaneously be outstanding for both the first data source and the second data source.

19. The apparatus of claim 18, wherein the load store unit is additionally coupled to a third data source through a third data port so that the load store unit can send multiple load requests to the first data source, the second data source, and the third data source simultaneously, and wherein the controller is configured to coordinate data flow so that multiple load requests can simultaneously be outstanding for the first data source, the second data source and the third data source.

20. The apparatus of claim 18, wherein the load store unit is coupled to the data cache through a first communication pathway, and is coupled to the second data source through a second communication pathway that is separate from the first communication pathway.

21. The apparatus of claim 18, wherein the controller is configured so that load requests return in-order for each of the multiple sources of data in the computer system, except for load requests directed to a data cache which can return out-of-order.

22. The apparatus of claim 18, wherein the controller is configured so that load requests can return out-of-order with respect to load requests from other data sources.

23. A method for supporting multiple outstanding load requests from an execution engine to multiple sources of data in a computer system including a data cache, the method comprising:
- receiving a load request from the execution engine, the load request specifying one of a first data source and a second data source, wherein the first data source is coupled to a first data port within the load store unit and the second data source is coupled to a second data port within the load store unit so that the load store unit can simultaneously send load requests to the first data source and the second data source;
- storing an address from the load request in a load address buffer, the load address buffer containing addresses for multiple outstanding load requests so that multiple load requests can simultaneously be outstanding for both the first data source and the second data source;
- sending the load request to one of the first data source and the second data source, wherein the first data source is the data cache; and
- in response to the load request, receiving data from one of the first data source and the second data source in a register file.

24. The method of claim 23, further comprising:
- receiving a store request from the execution engine;
- storing an address from the store request in a store address buffer, the store address buffer containing addresses for multiple outstanding store requests so that multiple store requests can simultaneously be outstanding for both the first data source and the second data source; and
- storing data from the store request in a store data buffer, the store data buffer containing data from the multiple outstanding store requests.

25. The method of claim 23, wherein the load request may additionally be directed to a third data source through a third data port so that the load store unit can send multiple load requests to the first data source, the second data source, and the third data source simultaneously, and wherein multiple load requests can simultaneously be outstanding for the first data source, the second data source and the third data source.

26. The method of claim 23, wherein sending the load request to one of the first data source and the second data source involves sending the load request through a first communication pathway to the first data source, and through a second communication pathway to the second data source, wherein the second communication pathway is separate from the first communication pathway.

27. The method of claim 23, wherein the act of receiving the data from one of the first data source and the second data source, involves receiving the data in order from the second data source, and receiving data out-of-order from the first data source.

28. The method of claim 27, wherein the act of receiving the data from one of the first data source and the second data source, includes receiving the data from a third data source, wherein the data may be received out-of-order as between the second data source and a third data source.

* * * * *